2,967,823
PROCESS FOR THE REFORMATION OF GASOLINE HYDROCARBONS WITH A METALLIC NICKEL CATALYST

Wolfgang Langenbeck, Rostock, Hermann Kaufmann, Leuna, and Jürgen Welker, Halle, Germany, assignors to VEB Leuna-Werke "Walter Ulbricht," Merseburg, Germany No Drawing. Filed Oct. 7, 1958, Ser. No. 765,722

Claims priority, application Austria Oct. 22, 1957

11 Claims. (Cl. 208—137)

This invention relates to a process for the catalytic reformation of gasoline hydrocarbons. The ever progressing development of carburetor engines or motors with the aim of obtaining the best possible economy has resulted in an ever increasing degree of compression in the motors. Closely connected therewith are the ever increasing demands on the anti-knocking rating of the fuels which are burned in such engines. Thus, particularly in the course of the last decade, a large number of processes have been developed, which aim at the conversion of the chemical components of gasolines, i.e. reformation, so as to satisfy this demand for a very favorable anti-knocking rating (highest possible octane number).

In contrast to the first known technical reformation processes, which were purely thermal processes without the use of catalysts, it was later found that only the employment of highly active catalysts makes it possible to produce gasolines which satisfy the demands of present motors. Of the numerous catalytic substances or substance-mixtures, which direct and accelerate the chemical conversion of gasoline-hydrocarbons in the desired direction, such catalysts, as, for example, $MoO_3/Al_2O_3$, $Cr_2O_3/Al_2O_3$, Comolybdate, and lately, particularly platinum-containing catalysts have proven to be particularly suitable.

Metallic nickel may not be used for such processes, since it disintegrates both the C-C bond, as well as the C-H bond, and therefore causes the formation of carbon, hydrogen and methane. Olefin-rich products also inactivate the nickel in the presence of hydrogen, under the required working conditions, after a relatively short time.

Nevertheless, many experiments have been conducted to utilize the more readily available nickel for the purpose in question. Thus, it has already been suggested some time ago that nickel be used in the form of a sulfide or oxide alone or in mixture with sulfides or oxides of the heavy metals of the sixth and/or the 8th group of the periodic system, for the hydrogenating or dehydrogenating and also refining treatment of technical gasoline-hydrocarbon mixtures. Also, oxides which cannot be reduced, such as zirconium-, thorium-, or cerium-oxide, were sometimes added to such nickel-containing catalysts.

All the above mentioned catalysts require for their successful use in the reformation of gasoline, a relatively high hydrogen pressure which normally has to be considerably above 10 atmospheres. Furthermore, they only work in the desired direction at temperatures around 400° C. up to above 500° C. Under these conditions, obviously the loss of a portion of the raw material to be reformed in the main process, cannot be prevented due to vaporization. Some nickel-containing catalysts that have been developed during the last few years can only operate under similar drastic conditions, e.g., a catalyst containing 98% of $SiO_2$, 1% of $Al_2O_3$ and 1% of nickel.

In accordance with the present invention, it has now been found that gasoline hydrocarbons may be reformed with catalysts containing metallic nickel without significant vaporization losses when catalyst mixtures are used which comprise metallic nickel with oxides of the elements of the second group of the periodic system, e.g., Ra, Ba, Sr, Ca, Mg, Zn, Cd and Hg.

It has further been found that zinc oxide and magnesium oxide are particularly suitable among the oxides of the elements of the second group of the periodic system. The most favorable results are obtained through the use of these oxides in quantities between 50 and 95 mole-percent. It has been ascertained that by increasing the quantities of zinc or magnesium oxide, the tendency of metallic nickel to decompose the fuel which causes the vaporization losses previously mentioned disappears almost entirely, and the desired reforming effect of the catalysts increases to an over increasing extent.

It was most surprising that the catalysts proven to be particularly suitable for the present invention, i.e., nickel-metallic oxides catalysts, were those which were prepared from the corresponding oxalate and/or formate and/or carbonate mixed crystals. It was precisely when catalysts, which had been prepared from such mixed crystals, were used, that a further decrease of undesirable side reactions, e.g., gas-formation, was obtained. In fact such side reactions were completely eliminated.

The catalysts employed in this invention may, without their effect being deleteriously affected at all, be admixed with additional carriers, such as silicic acid, aluminum oxide, aluminum silicate, synthetic or natural earths, which, if desired, may first have been treated with hydrohalogen acids.

The process of the present invention is adaptable to reforming a gasoline fraction boiling in a wide range of temperatures, e.g. 80° to 200° C. In the preferred form of this invention a gasoline fraction boiling in the range of 100° to 130° C. is employed.

The present reformation of the gasoline hydrocarbons may be effected over a wide temperature range, e.g., between 200° C. to just above about 500° C. However, it is preferred to operate in the temperature range of 350° to 520° C.

In accordance with this invention the process may be carried out at atmospheric pressure or at super-atmospheric pressure. Furthermore, it will operate in the presence or absence of an atmosphere of hydrogen. In the preferred form of this invention the process is carried out in an atmosphere of hydrogen and under pressure in the range of 1 to 50 atm.

The following examples are further illustrative of the present invention, and it will be understood that the invention is not limited thereto.

Example 1

This experiment was conducted in a vertically arranged pipe having a diameter of 2 cm. The pipe was provided with a sieve bottom. 25.5 cm.³ of a catalyst in pellet form were introduced or poured into the pipe. The catalysts contained nickel and zinc oxide in a mole-ratio of 13:87. The catalyst was prepared from the mixed carbonate powders after the pellet formation by decomposition in a hydrogen stream of 32 cm.³ per hour. A gasoline fraction with a boiling point of 100° C.–130° C. was passed over this catalyst at 350° C. together with 80 liters of hydrogen. This fraction was taken from a reaction mixture which had been formed by catalytic cracking of a crude oil naphtha product. This gasoline contained 29.0% olefins, 7.5% aromatics, 33.0% naphthenes, 30.5% aliphatics, and had a research octane rating of 75.

After the catalytic heat treatment, a gasoline of practically unchanged boiling characteristics was obtained.

The yield by weight was 95.0%. This gasoline contained only 4% of olefins. The content of aromatics rose to 21%, while the naphthenes and aliphatics amounted each to 37.5%. The research octane rating dropped to 72, i.e., it dropped only by 3 units in spite of the far-reaching removal of the olefins.

*Example 2*

The same apparatus used in Example 1 was filled with a nickel-zinc oxide catalyst containing 90 mole percent of zinc oxide. This catalyst was obtained by the decomposition of oxalate mixed crystals of both metals by a stream of hydrogen at 350° C. 15 cm.³ of the same olefin-rich gasoline fraction, together with 50 liters of hydrogen, were conducted over this catalyst hourly.

98% by weight of the material introduced was recovered. There is contained in this reformed gasoline 2.5% olefins, 27.5% aromatics, 38.0% naphthenes and 32.0% aliphatics. The research octane rating is 76.

*Example 3*

The starting product used in Examples 1 and 2 was freed of its olefinic hydrocarbon components by careful treatment with sulfuric acid. The hydrocarbon mixture so obtained contained at this time 1.0% olefins, 10.5% aromatics, 46.0% naphthenes and 42.5% aliphatics and exhibited a research octane rating of 63. This gasoline fraction, which is practically free of olefins, was handled in the same apparatus, under the same conditions, and over the same catalyst as described in Example 2. With the same superior yield a gasoline is obtained having the following composition: 2.0% olefins, 31.5% aromatics, 26.0% naphthenes and 40.5% aliphatics. The research octane rating was raised by 20 units to 83.

A comparative test, carried out under completely identical process conditions, wherein, instead of the above catalysts, pure metallic nickel (prepared from the oxalate) was employed, left practically no fluid reaction products. The total starting product was almost completely decomposed to methane with a vigorous evolution of heat.

The same results, of the complete decomposition to gaseous hydrocarbons, were obtained in other comparative tests wherein metallic nickel-aluminum oxide or metallic nickel-manganese oxide were used as catalysts.

*Example 4*

In this example the same starting products and conditions used in Example 3 were employed. The single change is that the nickel containing catalyst contained magnesium oxide in the same mole proportions instead of zinc oxide, which in this case was prepared from the corresponding formate mixed crystals. With only a little smaller yield, a gasoline of practically the same hydrocarbon composition is obtained. The research octane rating amounted to 80.

*Example 5*

By using a catalyst, which, besides 90 mole percent of zinc oxide (based on nickel), also contains 16.4% by weight of $SiO_2$, using the same procedure described in Examples 2 to 4, a gasoline is obtained in about the same yield whose research octane rating is 81.

What is claimed is:

1. A process for reforming a gasoline hydrocarbon fraction boiling in the temperature range of about 80° C. to 200° C. to improve the octane rating thereof which comprises contacting said gasoline hydrocarbon in the presence of hydrogen at elevated temperatures in the range of about 200° C. to 520° C. with a catalyst consisting of a mixture of metallic nickel with an oxide selected from the group consisting of zinc oxide, magnesium oxide and mixtures thereof and recovering said gasoline fraction with the improved octane rating.

2. A process for reforming a gasoline fraction boiling in the temperature range of about 80° C. to 200° C. to improve the octane rating thereof which comprises contacting said fraction at elevated temperatures in the range of about 200° C. to 520° C. with a catalyst consisting of a mixture of metallic nickel; an oxide selected from the group consisting of zinc oxide, magnesium oxide and mixtures thereof; and a carrier selected from the group consisting of silicic acid, aluminum oxides, aluminum silicate, synthetic earths, natural earths and the corresponding hydrohalogen acid treated earths; and recovering said gasoline fraction with the improved octane rating.

3. A process according to claim 1 wherein said reformation is effected at atmospheric pressures.

4. A process according to claim 1 wherein said reformation is carried out at superatmospheric pressure.

5. A process according to claim 1 wherein said catalyst contains said oxides in quantities of at least 20 mole percent.

6. A process according to claim 5 wherein said oxide is present in the range of 50–95 mole percent.

7. A process according to claim 1 wherein the catalysts employed are prepared from mixed crystals of compounds selected from the group consisting of the corresponding oxalates, formates and carbonates of the nickel and the element selected from the group consisting of zinc, magnesium, and a mixture thereof.

8. A process according to claim 2 wherein the reformation is effected at atmospheric pressures.

9. A process according to claim 2 wherein the reformation is effected at superatmospheric pressure.

10. A process according to claim 2 wherein said catalyst contains said oxides in quantities of at least 20 mole percent.

11. A process according to claim 10 wherein said oxide is present in the range of 50–95 mole percent.

References Cited in the file of this patent

UNITED STATES PATENTS

| | | |
|---|---|---|
| 1,271,013 | Bosch et al. | July 2, 1918 |
| 2,083,795 | Schiller et al. | June 15, 1937 |
| 2,229,199 | Voorhies | Jan. 21, 1941 |
| 2,341,995 | Kipper | Feb. 15, 1944 |
| 2,780,584 | Doumani | Feb. 5, 1957 |